Patented Feb. 13, 1923.

1,445,200

UNITED STATES PATENT OFFICE.

OTTO W. BULLARD AND FRANK C. BULLARD, OF SHERIDAN, WYOMING.

FORMULA FOR A CONFECTION.

No Drawing.　　Application filed March 25, 1921.　Serial No. 455,489.

*To all whom it may concern:*

Be it known that we, OTTO W. BULLARD and FRANK C. BULLARD, citizens of the United States, residing at Sheridan, in the county of Sheridan and State of Wyoming, have invented certain new and useful Improvements in a Formula for a Confection; and we do hereby declare the following to be a full, clear, and exact description of the invention, such as will enable others skilled in the art to which it appertains to make and use the same.

The object of the invention is to provide a novel confection adapted to be produced in the form of an ice or for use in a semi-frozen condition, and more particularly to provide a base for use in the production of an ice or frappé susceptible of variation by the use of different flavoring agencies and the combination therewith of other ingredients modifying the appearance, consistency and taste thereof.

In carrying out this object it is proposed to boil or cook a solution in water or similar solvent of the following substances, to wit:

Glucose (corn syrup), 48 pounds,
Granulated sugar, 32 pounds,
Lime water, 1 pound (1 pint).

This solution should be boiled or cooked at a temperature of approximately 240 degrees Fahrenheit until it is in a freely liquid state.

The liquid should then be subjected to the action of a mechanical beater and thoroughly beaten or whipped for a period of say five minutes whereupon, to the mass, should be added a solution in four pounds (half a gallon) of water, of two pounds of egg albumen (in a dry state), the albumen being dissolved in the water before adding it to the beaten and cooked combination of glucose, sugar and lime water. The combined solutions should then be beaten thoroughly until the mass acquires a sticky or pasty condition.

The foregoing product constitutes a base with which may be combined flavoring agencies of different kinds such as fruit syrups or the like, and then subjected to a freezing temperature, either in molds or otherwise, to serve as an ice or frappé.

One form in which the base can be used contemplates the addition to two gallons of the base of three gallons of whipped cream together with a flavoring agency such as vanilla or any equivalent or preferred syrup which should be thoroughly mixed and then the mass should be packed in chopped ice with salt or brine, without agitation or beating, to congeal or freeze to the desired degree of semi-solidity.

Having thus described the invention, what I claim is:—

A method of preparing a base for frozen confections which comprises cooking a liquid consisting essentially of cane sugar, glucose syrup and lime water, adding thereto a solution of egg albumen in water, and finally beating the mass to a creamy consistency, and refrigerating the creamy mass.

In testimony whereof we affix our signatures in presence of two witnesses.

OTTO W. BULLARD.
FRANK C. BULLARD.

Witnesses:
　EFF SHARP,
　HOWARD B. SHARP.